Oct. 15, 1940.　　　　J. MIHALYI　　　　2,218,248
FOCAL PLANE SHUTTER CONSTRUCTION
Filed Sept. 24, 1938　　　　3 Sheets-Sheet 1

Joseph Mihalyi
INVENTOR

BY
ATTORNEYS

Oct. 15, 1940.    J. MIHALYI    2,218,248
FOCAL PLANE SHUTTER CONSTRUCTION
Filed Sept. 24, 1938    3 Sheets-Sheet 2

Joseph Mihalyi
INVENTOR

BY
ATTORNEYS

Oct. 15, 1940.  J. MIHALYI  2,218,248

FOCAL PLANE SHUTTER CONSTRUCTION

Filed Sept. 24, 1938  3 Sheets-Sheet 3

Joseph Mihalyi
INVENTOR

BY
ATTORNEYS

Patented Oct. 15, 1940

2,218,248

UNITED STATES PATENT OFFICE 2,218,248

FOCAL PLANE SHUTTER CONSTRUCTION

Joseph Mihalyi, Rochester, N. Y., assignor to Eastman Kodak Company, Rochester, N. Y., a corporation of New Jersey Application September 24, 1938, Serial No. 231,573

10 Claims. (Cl. 95—57)

This invention relates to photography and more particularly to focal plane shutters for cameras. One object of my invention is to provide a focal plane shutter in which an even exposure is made across the entire width of a film. Another object of my invention is to provide a focal plane shutter arranged so that the slot between the two shutter sections will progressively alter in size to automatically take care of a varying speed of travel of the shutter members so that an even exposure may be produced even though the lineal speed of the shutter members across the aperture may not remain constant. Another object of my invention is to provide a focal plane shutter with positive means for causing one shutter to move across the exposure aperture more rapidly than the other shutter, to compensate for the varying speed of travel of the shutter members. A still further object of my invention is to provide a shutter in which individual take-up rollers are employed and in which the two curtains are unwound from unwinding rollers which may be coupled together to turn at the same angular velocity, the diameter of the roller supporting one curtain being different from the roller supporting the other curtain. Other objects will appear from the following specification, the novel features being particularly pointed out in the claims at the end thereof.

In the so-called miniature type of cameras, in which the space for a focal plane shutter is quite restricted, it has been in the past extremely difficult, if not impossible, to provide spring rollers which are sufficiently strong to move the curtains across the exposure aperture at a constant speed. It has been usually found with focal plane shutters that the curtains tend to accelerate as the spring rollers get up to speed, and consequently, it frequently happens that one side of a picture area may be properly exposed whereas the opposite side may gradually become under-exposed due to the speed of the curtains.

To overcome this difficuty, I have provided a focal plane shutter in which the width of the opening varies in proportion to the acceleration or deceleration in the shutter members, thus producing an even exposure across the entire film even though the shutter members may alter in speed as they move across the exposure frame.

I have provided a positive coupling between the two shutter members and have provided a positive means for varying the opening uniformly and to the same amount each time between the shutter members by unrolling one curtain from spools of greater diameter than the spool supporting the opposite curtain and by coupling the spools together so that they may move at the same angular velocity.

While I have illustrated as a preferred embodiment of my invention a shutter is which the shutter springs accelerate increasing the speed of the shutter members as they cross the exposure aperture, it is also possible to apply the same principle which I have designed to a shutter in which the shutter members decelerate as they cross an exposure aperture. By properly adjusting the relative size of the unwinding rollers in proportion to each other, the characteristics of any particular type of shutter spring can be properly taken care of. While I am aware that a focal plane shutter has been designed in which the slot is variable during exposure, I am not aware of any such focal plane shutter in which the shutter members are coupled together to definitely produce a regular alteration in the slot width which is positively controlled from the start to the finish of an exposure.

Coming now to the drawings, wherein like reference characters denote like parts throughout:

Figure 1:
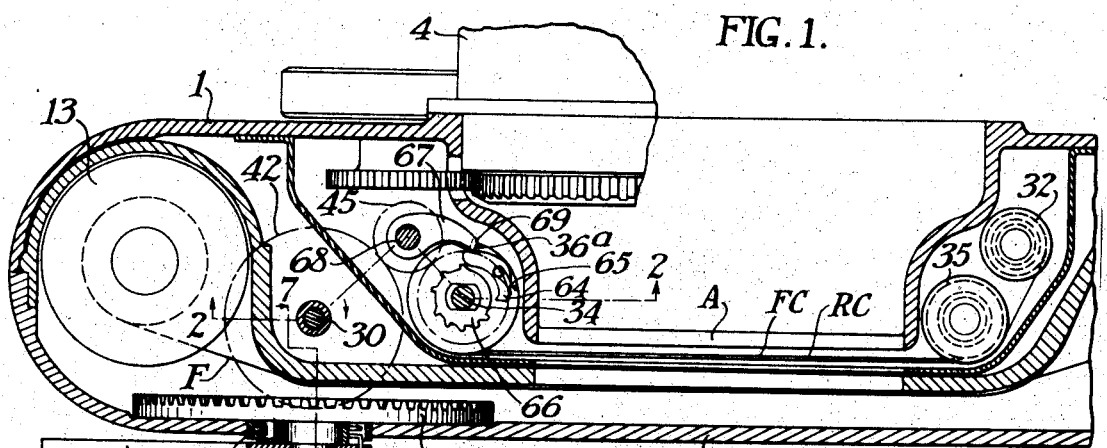
Fig. 1 is a top plan in section, showing a camera having a curtain shutter embodying this invention.

The camera to which the curtain shutter of the present invention is shown applied has a body 1 with a top wall 2, bottom wall 7, removable back 3, a suitable lens mount assembly, partially indicated at 4, and a housing or superstructure 5 within which most of the shutter control members are arranged. A selector dial 6 is arranged for convenient manual operation to vary the speed control mechanism.

Figure 7:
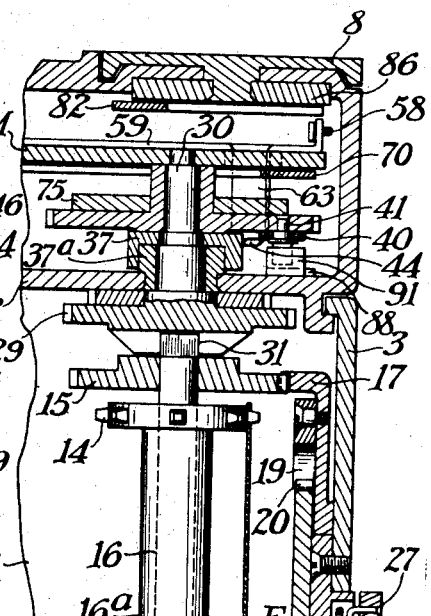
Fig. 7 is a vertical fragmentary section on line 7—7 of Fig. 1.

The body 1 is adapted to hold perforated roll film F, supplied from a cassette or magazine, and adapted to be wound onto a spool 13 in the opposite end of the camera. The film is transported from the cassette to the spool 13 by driven sprockets 14, the teeth of which engage perforations P in the film. These sprockets are so proportioned that a single full revolution thereof advances the film one "frame." Movement of the sprockets is accomplished through a gear 15, mounted on the sprocket shaft 16. The latter extends through a sleeve 16ª by means of which a separable connection (not shown) may be utilized to provide for winding the film back into the cassette by means of a knob. Gear 15 is constantly in engagement with a crown gear 17 lying against the inside of the rear wall 3. This crown gear is revoluble on a fixed bearing 18 and carries on its inner face a spring-pressed pawl 19, which is caught by teeth on a ratchet 20 when the latter is rotated counterclockwise (Fig. 7). The ratchet hub has a square end 21, to which a crank 22 is attached by a stud 23. A pin 24 is set into an annular depression 25 in the bearing 18 (Fig. 7) and to this pin is attached one end of a light torsion spring 26, the other end of said spring being anchored in the crank 22 at 27.

When the crank 22 is moved counterclockwise the ratchet 20 through its engagement with pawl 19 drives crown gear 17 and spur gear 15 to revolve shaft 16 in a clockwise direction (when viewed from above). The spring 26 returns the crank to normal, the ratchet teeth riding freely under pawl 19. The crown gear 17 and spur gear 15 because of ratchet 20, may rotate only in the directions above noted.

The same movement of the crank 22 that advances the film also rotates the spool 13, through a train of gears 28 that are engaged by a gear 29 on a stub shaft 30, revoluble in a bushing, fixed in the top wall 2. An overrunning clutch, not shown, is provided in this gear train to compensate for the increasing diameter of the roll of film on spool 13. The upper end of shaft 16 is squared and enters a slot 31 in the bottom of gear 29, thus providing a driving connection between gears 15 and 29.

Figure 11:
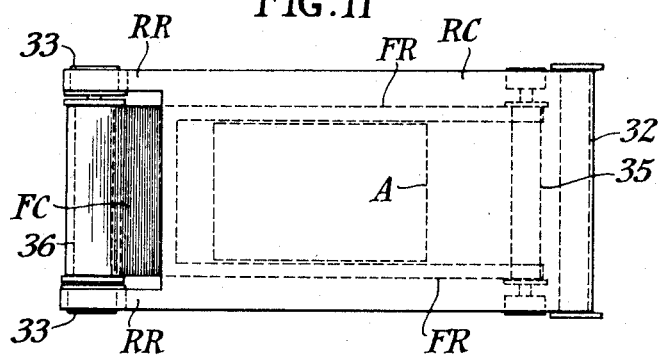

The shutter proper comprises two curtains, the rearmost of which, designed RC, is fastened at one end to a spring roller 32, and by ribbons RR on its other end to spools 33 fixed on a shaft 34 (Figs. 2 and 11) that extends up into the housing 5. The front curtain FC (nearest the lens) is fastened by means of ribbons FR to a spring roller 35 and at its other end (left end in Fig. 2) to a roller 36 that is revoluble on shaft 34. The roller 36 and spools 33 are hereinafter referred to as "winding" rolls, while the spring driven rollers 32 and 35 are called the "foot rollers."

The foot rollers 32 and 35 are constructed in the usual manner with torsion springs that constantly urge these rollers to rotate counterclockwise (as viewed from above) and tending to carry the curtains from left to right across the exposure frame A. The winding of the curtains, or the "setting" of the shutter, is in opposition to the force exerted by the foot roller springs.

Figure 6:
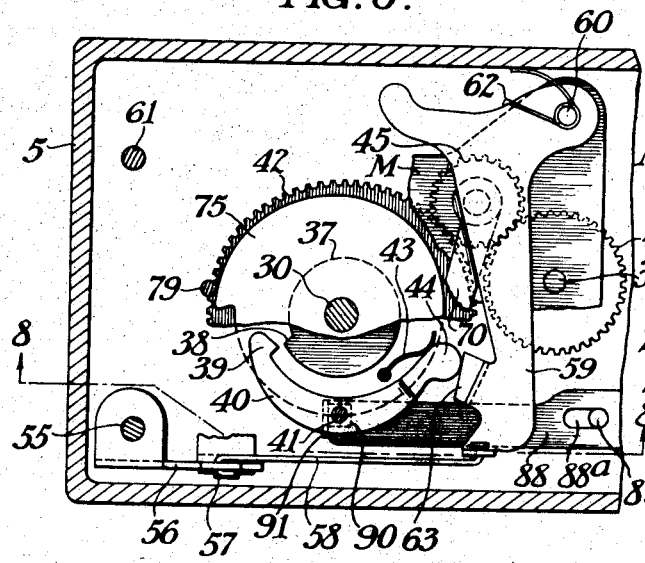
Fig. 6 is a partial section plan substantially on line 6—6 of Fig. 2, some parts being broken away to exhibit details in a lower plane.

In winding, the movement of crank 22 before described rotates shaft 30 in a clockwise direction. A collar 37, centered on a stud 37ª, is fixed to shaft 30 and has a single projecting tooth 38 (Fig. 6). This tooth is engaged by a hook 39 on a pawl 40 that is pivoted at 41 on the underside of a gear 42, the latter being revoluble on the reduced portion of shaft 30. The hook 39 is held normally in engagement with the tooth 38 by a spring 43 that presses against the bulb shaped tail 44 of the pawl. Collar 37 rotating clockwise thus carries pawl 40 and gear 42 with it, and the latter through an idler gear 45 drives a gear 46 pinned to shaft 34 and thus rotates said shaft clockwise also. A ratchet 47 fixed on shaft 30 and engaged by a stationary pawl 48 prevents said shaft, and therefore the collar 37, from rotating counterclockwise, although gears 42 and 46, being free on the shaft, may be so rotated when released, through the pull of the curtains when urged by rollers 32 and 35.

Figure 12:
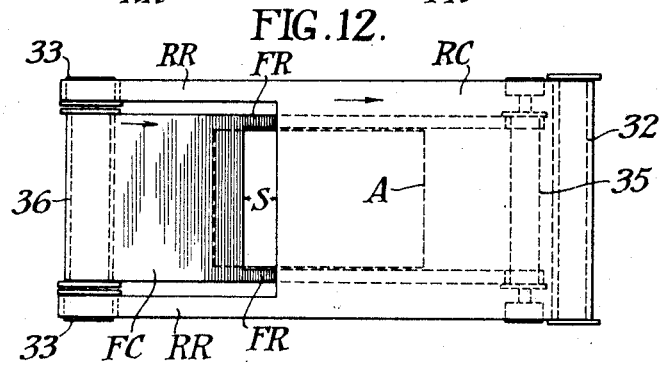
Figure 13:
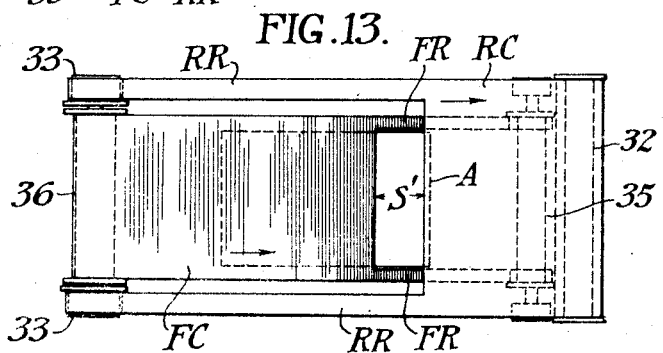

The spools 33, as the crank 22 is moved to the right, carry the rear curtain RC to the left (Figs. 11 to 13) to cover the exposure frame A.

Figure 5:
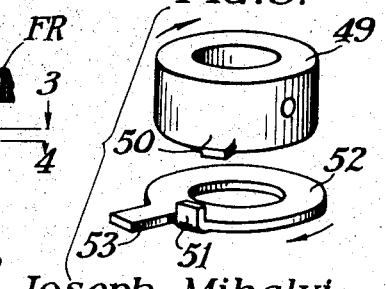
Fig. 5 is a perspective view of a collar and another part shown in Fig. 3.

Fixed to the shaft 34 is a collar 49, having a radial lug 50. Below this collar is a washer 52, freely revoluble, and provided with an upstanding lug 51 and a radial lug 53 (Fig. 5). A pin 54 set in the bottom of roller 36 projects into the path of lug 53 but is clear of lugs 50 and 51. When both curtains are unwound these parts occupy the positions shown in broken lines, Fig. 3. Clockwise rotation of shaft 34 and therefore of collar 49 causes lug 50 to pick up lug 51. Lug 53, being part of washer 52 immediately contacts pin 54 and roller 36 is carried around for approximately (in the present design) $1\frac{1}{10}$ revolutions, at which point the gear 42 has made one full revolution and pawl hook 39 engages shoulder 38. A dog 67, to be more fully described, at the same time engages a notch 36ª in the top flange of roller 36 and prevents curtain foot roller 35 from rotating roller 36. Therefore both spools 33 and roller 36 are held in "wound" position. As both curtains move to this position together, the exposure frame A is completely covered during the winding operation.

It should be understood that the movement of crank 22, previously described, rotates gear 42 only one full revolution, the $1\frac{1}{10}$ revolutions of shaft 34 being obtained through suitably-sized gears 45 and 46. Gear 42 is limited to one revolution by means of a slidable bar 88, slotted at 88ª so that it is stopped by a pin 89 (Fig. 6). A square stud 90 projecting from the bottom of gear 42 (actually an extension of pivot 41) strikes an upturned lug 91 on the left end of slide bar 88 when gear 42 nears the end of its one revolution in either direction, and the resulting slight movement brings the slide bar 88 to a stop against pin 89 at the instant that pawl hook 39 drops over shoulder 38.

The parts above described are prevented from "unwinding," that is, the curtains RC and FC cannot be moved to the right and onto the rollers 32 and 35 because the pawl hook 39 is caught into the tooth 38 on collar 37, and the latter cannot be rotated backwardly, or counterclockwise, because of the ratchet 47 which is held by pawl 48. To release the curtains the pawl 40 must be moved so that the hook 39 is freed from the tooth 38; and means are provided for this purpose and are shown in Fig. 6.

The operating button 55 projects through the top wall 6 of the housing 5, and its lower end contacts a trigger member comprising a bell-crank 56, pivoted at 57. One arm of this bell-crank is connected by a link 58 to a horizontally movable lever 59, hereinafter referred to as the release member, pivoted at 60 on a plate M, which may be termed the mechanism plate, as it also carries a number of other movable parts and is supported by suitable spacers and studs 61 at the required distance from the camera top wall 2. A suitable spring 62 tends to swing the release member 59 counterclockwise about its pivot and to move its free end toward the right.

If the button 55 is pressed, the bellcrank is swung about its pivot and the link 48 pulls member 59 toward the left. A downturned lug 63 (Figs. 6 and 7) then strikes the end 44 of pawl 40 and swings the latter sufficiently to move hook 39 away from the tooth 38. As the spring-rollers 32 and 35 are at all times pulling the curtains RC and FC, the curtains then would be free to move across the frame A when the pawl 40 is disengaged, but to prevent and control such action, certain detents and restraining devices including timing mechanism are provided as will be described.

Figure 9:
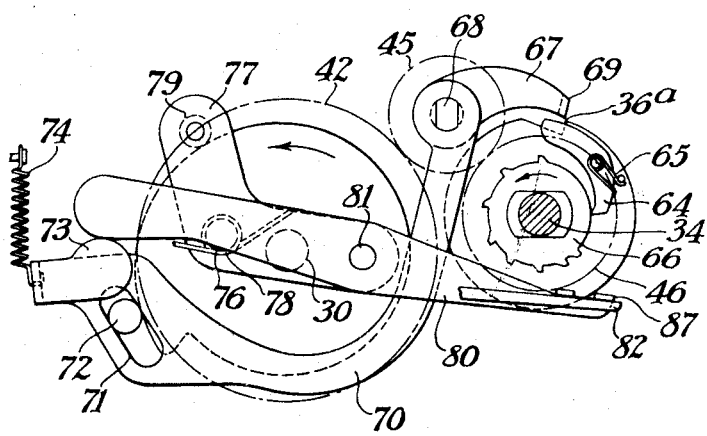
Fig. 9 is a top plan of a portion of the time control mechanism.

Referring first to Figs. 1 and 9, it will be noted that the top face of roller 36 carries a pawl 64, constantly urged by a spring 65 toward a ratchet 66, hereinafter referred to as the timing ratchet, which is fixed to shaft 34. It is therefore obvious that this ratchet will revolve with the shaft 34 relatively to the roller 36, provided that the latter is held against rotation. Normally, roller 36 is so held by a dog 67 that is fixed to a short shaft 68 extending through the top wall 2. This is the same shaft that carries idler gear 45, the latter being freely revoluble thereon. The end of dog 67 has a downturned lug 69 (Fig. 9) that normally rests in a notch 36ᵃ in the upper flange of roller 36, thereby holding the latter aganist counterclockwise rotation under the constant pull of its foot-roller 35. The lug 69 in addition to engaging the notch 36ᵃ also strikes the tail of pawl 64 and holds the toothed end thereof away from ratchet 66.

Figure 8:
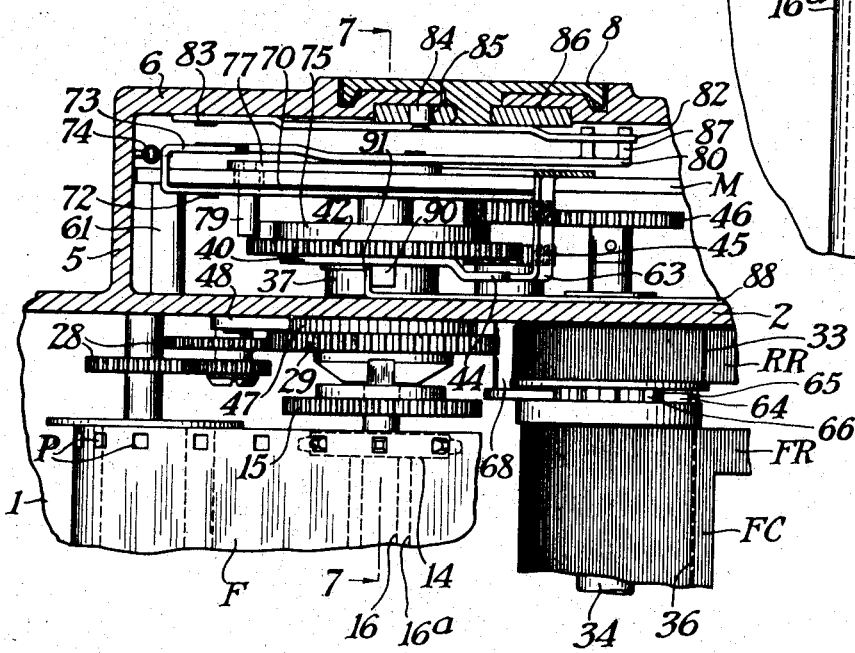
Fig. 8 is an enlarged fragmentary vertical section substantially on line 8—8 of Fig. 6.

Fixed upon the upper end of shaft 68 is a lever 70 with a slot 71 guided by a fixed pin 72. The extreme left end 73 of lever 70 is turned up and over the plate M (see Figs. 8 and 9) to align with a trip lever later described. Lever 70 is referred to henceforth as the curtain latch lever. A spring 74 tends to hold the latch lever 70 in the position of Fig. 5 so that the lug 69 of dog 67 will turn pawl 64 against the action of the light spring 65 and free the tooth of the pawl from ratchet 66. In this condition the shaft 34 and therefore the spools 33 and curtain RC are free to move if pawl 40 is tripped by release member 59, but roller 36 and curtain FC are held by dog 67.

In order to carry a slit S of the required width across the exposure frame A, and also to cause said slit to widen as it so travels (indicated as S in Fig. 12) the mechanisms about to be described are utilized to accomplish the above results.

Fixed to the top of gear 42 is a cam 75 (Figs. 6 and 9). Pivoted at 76 on the top of plate M is a bellcrank 77, urged clockwise by a spring 78 so that a pin 79 projecting downwardly is caused to bear against the periphery of the cam. As the cam 75 revolves counterclockwise with gear 42 whenever the pawl 40 is kicked off by release member 59, the bellcrank 77 will turn clockwise about the pivot 76 until the pin 79 strikes the cam, the contour of the latter being so designed that the farther it rotates counterclockwise the greater will be the movement or turning arc of the bellcrank 77 before stopping.

As the bellcrank turns, it carries bodily with it a lever 80, referred to as the "trip lever," pivoted at 81 in one arm of the bellcrank. Under the top of housing 5 is a lever 82 pivoted at 83 and having a pin 84 that projects upwardly into a cam slot 85 in a disc 86. This disc is integral with external dial 8, and when the latter is rotated to select a speed according to index marks provided (not shown) lever 82 will be moved forwardly if the selected speed is fast, and rearwardly if the selected speed is slow, and thus will act as an adjustable timing stop.

It is to be understood that curtain C begins to move across the exposure frame A, under the pull of its spring-operated foot roller 32, the instant that the hook 39 of pawl 40 is disengaged from the ratchet tooth 38 by the impact of release lever lug 63. As shaft 34 thus turns with spools 33, and through gears 46 and 45 rotates gear 42 in a counterclockwise direction, cam 75 (fixed to gear 42) also turns counterclockwise. As bellcrank 77 and pin 79 follow the cam contour as above described, their movement results in the trip lever 80 being carried rearwardly until lugs 87 on lever 80 strike the lever 82. As the right end of lever 80 can then move no further, and as cam 75 permits bellcrank 77 to rotate clockwise, it is obvious that the left end of lever 80 will move rearwardly faster, until it contacts the upturned lug 73 of latch lever 70, when it will turn the latter and shaft 68, and swing the dog 67 clear of notch 36ᵃ in the top flange of roller 36. This movement not only frees the roller 36, but permits spring 65 to move the dog end of pawl 64 toward timing ratchet 66, so that said dog will engage an appropriate tooth of this ratchet immediately. Spools 33 and shaft 34 then cannot overrun roller 36 even if the spring in foot roller 32 should be stronger than the spring in foot roller 35.

The width of the slit S at the start of the curtain movement as above described is a result of the positioning of lever 80 by means of lever 82, so that the left edge of curtain RC is permitted to lead the right edge of curtain FC (Fig. 12) by the required amount to form the "slit" shown at S.

Figure 2:
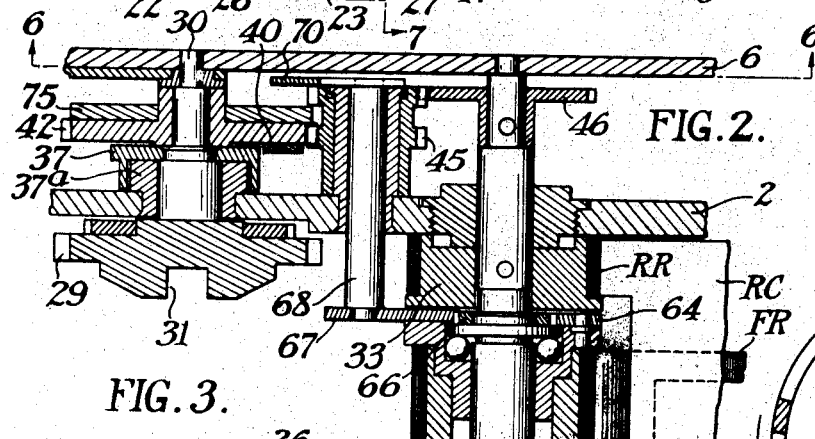
Fig. 2 is a vertical section, enlarged, substantially on line 2—2 of Fig. 1.

Spools 33 are slightly larger in diameter than the roller 36, as indicated in Fig. 2 by $D^{33}$ and $D^{36}$ respectively. This differential is worked out to give the required uniform over-all exposure before mentioned, as the curtains continue to accelerate across the exposure frame A toward their foot rollers. Obviously, if spools 33 and roller 36 are locked together and are thus compelled to rotate as a unit, the larger diameters of the spools 33 will permit a greater length of the ribbons RR to unwind per revolution than the amount of front curtain FC that will unwind from the roller 36, both being under tension. It is this locking of the spools 33 and roller 36 together, and the differential diameters thereof with the above described result, that constitute an important feature of this invention.

As the spools 33 and roller 36 obviously cannot be locked together after the slit has passed the exposure frame (because the slit must close before the curtains are rewound), and need not be locked together while the curtains are being rewound, (it being necessary only to cover the exposure frame), mechanism is introduced to prevent the roller 36 from overrunning the spools 33 and shaft 34 during the exposure time only. The latter are prevented from overrunning the roller 33 as above described, through the engagement of pawl 64 with the ratchet 66 which is fixed to shaft 34.

Figure 4:
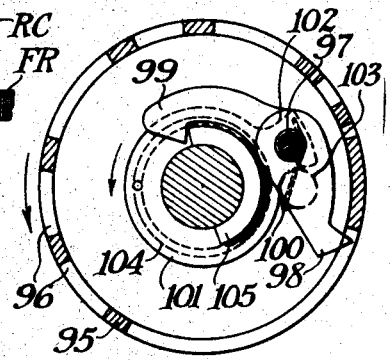
Fig. 4 is a similar view on line 4—4 of Fig. 2.
Figure 10:
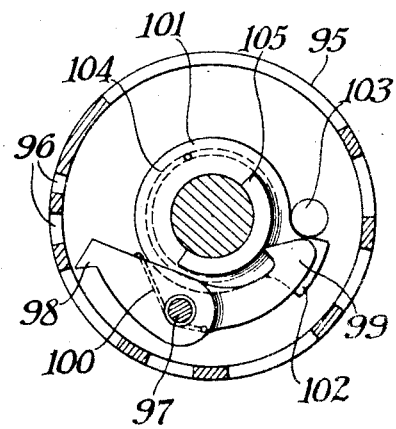
Fig. 10 is a section similar to Fig. 4 with the parts in a different relation and Figs. 11, 12, and 13 are rear elevations, somewhat diagrammatic, of the curtain assembly at various stages of an exposure.

Referring to Figs. 4 and 10, the lower annular flange 95 of roller 36 has a number of slots 96. These slots coincide in arcuate location with the teeth of timing ratchet 66, that is, to correspond to required positions or portions of a revolution through which said ratchet will turn in establishing a slit for various exposures from say, one-thousandth of a second to one twenty-fifth of a second.

In the lower spool 33 is a free stud 97. Fixed to this stud above the spool is a pawl 98, and fixed to the lower end of said stud in a recess formed by the lower edge of spool 33 is a hook member 99. A spring 100 presses the pawl 98 into any one of the notches 96 with which the pawl may be aligned, and roller 36 is thus prevented from overrunning spools 33 in a counter-clockwise direction (Fig. 4) although the spools 33 may rotate counterclockwise with respect to the roller 33, the pawl 98 in that case merely dragging idly across the notches or slots 96.

Under the hook 99 and revoluble about the shaft 34 on the bottom of the camera is a washer 101, having an outstanding lug 102 adapted to contact a pin 103 fixed in the bottom wall 7. The washer 101 is constantly urged in a counter-clockwise direction (Fig. 4) by a torsion spring 104, so that one end of a semicircular upstanding collar 105 that is part of washer 101 constantly is caused to press against the hook 99.

When the shaft 34 and spools 33 start to rotate counterclockwise, after the pawl hook 39 is disengaged from the tooth 38, the hook 99 and pawl 98 move counterclockwise, and the collar 105 remains in engagement with the hook 99 because of the unwinding effect of spring 104. During this movement pawl 98 drags idly over the notches 96.

When latch dog 67 is moved out of notch 36ᴬ as previously described, roller 36 and curtain FC are left to move under the urge of foot roller 35. If the spring in roller 35 should cause the latter to move curtain FC at a faster rate than curtain RC, roller 36 would tend to overrun and so in so doing would reduce the width of slit S. This overrun is prevented however, because pawl 98 engages the first notch 96 that catches up with it, and this notch will be in a location that will correspond to the tooth on timing ratchet 66 that is engaged by pawl 64. The result of the simultaneous engagement of pawls 64 and 98 is to lock spools 33 and roller 36 together against relative rotation in either direction. They therefore rotate counter-clockwise as a unit, and because of the differing diameters of spools 33 (D33) and roller 36 (D36) the curtains RC and FC will be reeled off at correspondingly different linear speeds, the curtain RC moving the faster. Consequently, slit S increases in width at a constant rate, reaching its maximum at the right edge of exposure frame A as represented by $S^1$ in Fig. 13. This increasing width will compensate for the increasing linear speed of the curtains due to the acceleration from the pull of foot-rollers 32 and 35, and therefore produces a uniform exposure.

When the slit $S^1$ has passed beyond the exposure frame A, the washer 101 has been carried around by spring 104 to a location (Fig. 10) where lug 102 strikes fixed pin 103. Washer 101 can move no further, but hook 99 is carried on around because gear 42 has not yet completed its full revolution. When the latter occurs and pin 90 has forced slide 88 as far to the right as slot 88ᵃ will permit, curtain RC can travel no farther. In the interim hook 99 has overridden collar 105 and this action retracts pawl 98 from the notch in roller rim 95 with which it was engaged. Roller 36 is thus no longer locked to shaft 34 and spools 33, so its foot roller 35 may carry the curtain FC the remainder of its travel and said curtain will come to rest.

In the construction illustrated, the parts are so proportioned that the curtain RC travels its full course during one and eight-tenths revolutions of shaft 34. This figure is not to be understood as invariable, however, as other proportions may be used to meet particular requirements.

When the curtains are rewound, and shaft 34 rotates clockwise, pin 97 carries pawl 98 and hook 99 with it and the latter picks up collar 105 against the action of spring 104, carries washer 101 along and lug 102 comes to rest against pin 103 just as hook 39 drops over shoulder 38 to latch the curtain RC against unwinding. (Fig. 4.)

Referring back to Fig. 3, it should be understood that the function of the loose-washer and lug construction shown therein is to permit slits of various widths to produce differently timed exposures, that is, to permit curtain RC to gain the necessary lead over curtain FC. In an exposure of 1/25 second for instance, frame A will be fully uncovered (in the present design) that is, the left edge of curtain RC will reach the right edge of frame A before curtain FC is released.

Figure 3:
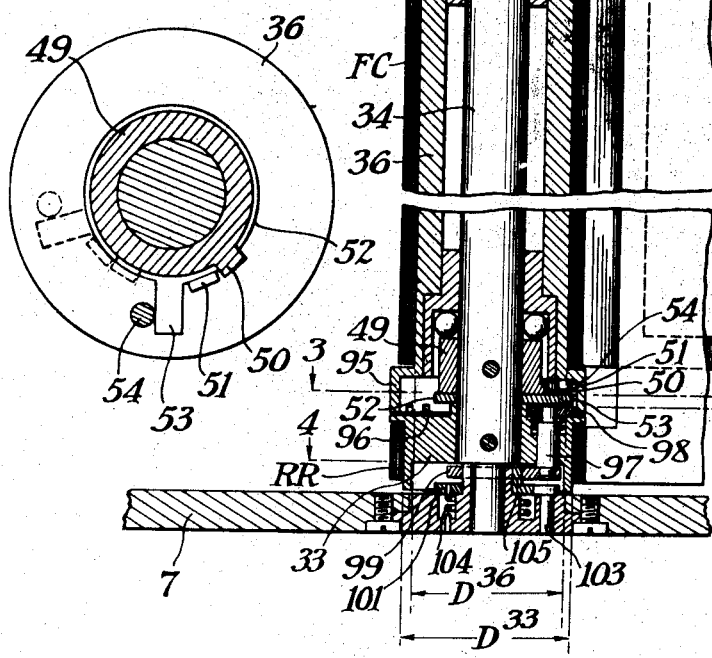
Fig. 3 is a detail sectional plan taken on line 3—3 of Fig. 2.

As soon as pawl 40 is tripped by lever 59, shaft 34 begins to rotate counter-clockwise from the position shown in full lines in Fig. 3. Washer 52 may or may not move with it, but after collar 49 makes one revolution, lug 50 strikes lug 51 and carries washer 52 along. Before lug 53 can strike pin 54 on the second revolution of shaft 34, dog 67 will have been moved out of notch 36ᴬ and both curtains will be locked to unwind together as before described. After shaft 34 and collar 52 have been stopped by stud 90 moving slide bar 88 to its right hand limit, roller 36 will continue to revolve until pin 54 catches up with lug 53, as shown in broken lines in Fig. 3. As lug 53 cannot move further because lug 51 is then in contact with lug 50 on collar 49, the roller 36 must stop also. At that time the right edge of curtain FC has passed well beyond frame A.

The shutter as described may, as in my previously mentioned pending application No. 212,269, be provided with detents and delayed-action devices for providing "time" and "slow automatic" exposures. As the present invention is operative for its intended purpose without these mechanisms they have been omitted from the drawings and the description.

It is obvious that means described whereby the exposure slit is uniformly increased in width as its travel rate accelerates, may be applied to curtain shutters in which the controls, the winding and release mechanisms are of different design from those illustrated herein. It is intended therefore that the invention is not to be limited to the precise arrangements and details shown in the drawings and described in this specification, but is to be construed as expressed in the following claims.

What I claim is:

1. In a focal plane shutter for cameras, the combination with two curtains of substantially the same thickness, a spring actuated wind-up roller and an unwinding roller supporting opposite ends of one curtain, a second spring actuated wind-up roller and a second unwinding roller supporting opposite ends of the other curtain, the diameters of the two unwinding rollers being different, means for coupling the two unwinding rollers together against relative rotation, and positive means for unwinding one curtain faster than the other.

2. In a focal plane shutter for cameras, the combination with two curtains of substantially the same thickness, a spring actuated wind-up roller and an unwinding roller supporting opposite ends of one curtain, a second spring actuated wind-up roller and a second unwinding roller supporting opposite ends of the other curtain, the diameters of the two unwinding rollers being different, means for coupling the two unwinding rollers together against relative rotation, and positive means for unwinding one curtain faster than the other comprising a difference in diameter between the first and second unwinding rollers.

3. In a focal plane shutter for cameras, the combination with two curtains of substantially the same thickness, a spring actuated wind-up roller and an unwinding roller supporting opposite ends of one curtain, a second spring actuated wind-up roller and a second unwinding roller supporting opposite ends of the other curtain, the diameters of the two unwinding rollers being different, means for coupling the two unwinding rollers together against relative rotation, and positive means for unwinding one curtain faster than the other comprising a difference in diameter between the first and second unwinding rollers, a single shaft for supporting the first and second unwinding rollers, one roller being fixedly mounted thereon and the other turning freely thereon.

4. In a focal plane shutter for cameras, the combination with two curtains of substantially the same thickness, a spring actuated wind-up roller and an unwinding roller supporting opposite ends of one curtain, a second spring actuated wind-up roller and a second unwinding roller supporting opposite ends of the other curtain, the diameters of the two unwinding rollers being different, means for coupling the two unwinding rollers together against relative rotation, and positive means for unwinding one curtain faster than the other comprising a difference in diameter between the first and second unwinding rollers, a single shaft for supporting the first and second unwinding rollers, one roller being fixedly mounted thereon and the other turning freely thereon, said means for coupling the unwinding rollers together embodying means for locking the roller turning freely on the shaft to the roller mounted fixedly thereon to turn therewith.

5. In a focal plane shutter for cameras, the combination with two curtains of substantially the same thickness, a spring actuated wind-up roller and an unwinding roller supporting opposite ends of one curtain, a second spring actuated wind-up roller and a second unwinding roller supporting opposite ends of the other curtain, the diameters of the two unwinding rollers being different, latches for holding the unwinding rollers against movement, a trigger for operating a latch permitting one curtain to move, mechanism for releasing the other curtain latch after the release of the first latch, means for coupling the two unwinding rollers together against relative rotation as the second curtain latch is released, and means included in the unwinding rollers for unwinding one curtain faster than the other whereby a slot formed between the two curtains by the actuation of the latches may constantly change as the two curtains unwind together.

6. In a focal plane shutter for cameras, the combination with two curtains of substantially the same thickness, a spring actuated wind-up roller and an unwinding roller supporting opposite ends of one curtain, a second spring actuated wind-up roller and a second unwinding roller supporting opposite ends of the other curtain, latches for holding the unwinding rollers against movement, a trigger for operating a latch permitting one curtain to move, mechanism for releasing the other curtain latch after the release of the first latch, means for coupling the two unwinding rollers together against relative rotation as the second curtain latch is released, and means for unwinding one curtain faster than the other and at a predetermined rate, whereby the slot formed between the two curtains by the successive actuation of the latches may vary at a constant rate as the curtains unwind, said means comprising a difference in diameter between the two unwinding rollers.

7. In a focal plane shutter for cameras, the combination with a shutter housing, of a pair of curtains of substantially the same thickness, a pair of spring driven rollers, one end of each curtain being attached to one of said rollers, unwinding rollers, one for supporting the opposite end of each curtain, means for connecting the rollers together against relative rotation, the diameter of one unwinding curtain roller being larger than the diameter of the other, and mechanisms for releasing the curtains with a predetermined slot therebetween whereby they may be wound on the spring rollers, one spring roller moving faster than the other to increase the width of the curtain slot as the curtains unwind from the different sized rollers turning at like angular speed.

8. In a focal plane shutter of the type including two curtains of substantially the same thickness, the combination with separate spring driven take-up rollers, one for each curtain, and separate rotatable unwinding rollers, one for each curtain, the unwinding roller for one curtain having a diameter greater than the diameter of the other unwinding roller, and means for locking the unwinding rollers together against relative rotation whereby they are adapted to move at the same angular velocity.

9. In a focal plane shutter of the type including two curtains of substantially the same thickness, one constituting a leading curtain and the other constituting a follower curtain, the combination with two spring driven rollers and two unwinding rollers, the leading curtain attached at one end to one spring driven roller and at the other end to one unwinding roller, the follower curtain attached at one end to the other spring driven roller and at the other end the other unwinding roller, the unwinding roller of the leading curtain having a larger diameter than the diameter of the unwinding roller of the follower curtain, and a coupling means for locking the two unwinding rollers together against relative rotation, said coupling means adapted to take effect after one unwinding roller has rotated relative to the other winding roller through a predetermined arc.

10. In a focal plane shutter for cameras, the combination with two curtains of substantially the same thickness, a spring driven roller attached to one end of each curtain, an unwinding roller attached to the other end of each curtain, one unwinding roller having a larger diameter than the other, first and second latches for holding the unwinding rollers against movement, a trigger for releasing said first latch for permitting one of said unwinding rollers to unwind, means operated by the unwinding of said roller adapted to release said second latch for permitting the other unwinding roller to unwind, and a clutch for holding the unwinding rollers together against relative rotation upon the operation of the second latch whereby the spring driven rollers may wind the curtains at constantly different speeds from the unwinding rollers as the latter turn at the same constant angular speed.

JOSEPH MIHALYI.